(12) United States Patent
Brewer

(10) Patent No.: US 6,235,998 B1
(45) Date of Patent: May 22, 2001

(54) STOPPER GATE FOR PRODUCT CONVEYOR

(75) Inventor: Marvin Vincent Brewer, Frisco, TX (US)

(73) Assignee: Recot, Inc., Pleasanton, CA (US)

( * ) Notice: Subject to any disclaimer, the term of this patent is extended or adjusted under 35 U.S.C. 154(b) by 0 days.

(21) Appl. No.: 09/417,962

(22) Filed: Oct. 13, 1999

(51) Int. Cl.[7] .................................................. G01G 13/00
(52) U.S. Cl. .......................... 177/103; 177/105; 177/145; 177/120; 198/358; 198/368; 198/370.01; 198/463.4; 222/55; 222/56
(58) Field of Search ..................................... 198/358, 360, 198/368, 370.01, 463.4; 177/105, 106, 107, 108, 109, 110, 111, 119, 145, 98, 99, 103, 104, 92, 93, 94, 95, 25.18, 120, 121, 122, 123; 222/55, 56, 77

(56) References Cited

U.S. PATENT DOCUMENTS

| | | | |
|---|---|---|---|
| 3,578,094 | * 5/1971 | Henry | 177/119 |
| 4,103,751 | * 8/1978 | Moss | 177/122 |
| 4,393,950 | * 7/1983 | Klopfenstein et al. | 177/108 |
| 4,522,321 | * 6/1985 | Kinoshita | 177/25.18 |
| 4,549,272 | * 10/1985 | Hagan | 198/368 |
| 4,580,698 | * 4/1986 | Ladt et al. | 222/55 |
| 4,635,831 | * 1/1987 | Kinoshita | 177/25.18 |
| 5,628,408 | * 5/1997 | Planke et al. | 198/360 |
| 5,767,455 | * 6/1998 | Mosher | 177/121 |
| 5,813,195 | * 9/1998 | Nielson et al. | 177/119 |
| 5,938,074 | * 8/1999 | Dartus | 222/55 |

* cited by examiner

Primary Examiner—Randy W. Gibson
(74) Attorney, Agent, or Firm—Colin P. Cahoon; Carstens, Yee & Cahoon

(57) ABSTRACT

An improved method and apparatus for distributing a food product, such as potato chips, which reduces the problem of staling. A plurality of stopper gates are placed adjacent to a plurality of slide doors on the downstream end of a distribution conveyor such that when the gate is closed the product is held over the slide door. Sensing and timing devices are used to control the actuation of the stopper gates for the most efficient operation, including a product level sensor, a weigher status sensor, and a timing device connected to the plurality of slide

28 Claims, 5 Drawing Sheets

STOPPER GATE FOR PRODUCT CONVEYOR

BACKGROUND OF THE INVENTION

1. Technical Field

The present invention relates to an improved product conveyor apparatus and, in particular, to a product conveyor apparatus which provides for efficient dispensation of the product on the first run through the product conveyor by use of a stopper gate. A plurality of stopper gates are positioned adjacent to a plurality of slide doors in the bottom of the product conveyor and controlled in order to limit the amount of product that is recycled along the recirculation conveyor. The invention greatly reduces the potential for product staling due to excessive product recirculation.

2. Description of Related Art

A vibrating conveyor is a commonly used device in the food industry for dispensing products such as potato chips into weighers. In most packaging lines, a product is moved along vibrating distribution conveyors having multiple product weighers placed below and along the length of the conveyor. When a weigher requires product, a slide door opens in the bottom of the distribution conveyor over that particular weigher and drops product onto the weigher. It is possible that the product might pass over all of the weighers without being dropped because none of the weigher doors are open when the product passes over. Rather than simply discarding the product that was not dispensed into the weighers, a recirculation conveyor is typically used to re-route the undispensed product back to the beginning of the distribution conveyor.

An example of a prior art design in this regard is illustrated by FIG. 1A. Throughout the specification, the same numerals are used to denote like parts. FIG. 1A shows a top view of a distribution conveyor 100 with a plurality of slide doors 105 and a recirculation conveyor The distribution conveyor 100 consists of multiple sections of distribution conveyor pans (not shown), each having a plurality of slide doors 105 mounted in the bottom of the conveyor pan. The conveyor pans are vibrated in the direction of product flow 125. In operation, the pan drops downward and in the opposite direction of product flow, and then lifts upward and forward in the direction of product flow 125. In this manner, the product is moved to a higher elevation at the end of each distribution conveyor pan before it is dumped onto the next distribution conveyor pan at a lower elevation.

The slide doors 105 are controlled by a weigher underneath the door 105 which sends a signal to open the slide door 105 when more product is needed. Thus, each slide door 105 operates independently of the other slide doors 105. The recirculation conveyor pans are similar in operation to the distribution conveyor pans except that they do not have slide doors, operating simply to move the product back to the initial stage 120 of the distribution pan.

FIG. 2A shows the distribution conveyor 100 in operation. The product 200, such as potato chips, comes out of the kitchen and is deposited onto the initial stage 120 of the distribution conveyor 100. It then passes over multiple slide doors 105 until it is dropped into an open slide door 105. If it passes over all of the slide doors without being dropped, then it is deposited onto the upstream end 130 of the recirculation conveyor 115 and re-routed back to the initial stage 120 of the distribution conveyor 100. In a typical system, approximately 20% of the product is re-routed down the recirculation conveyor back to the distribution conveyor. A significant portion of this 20% will get re-routed a second or third time. It is conceivable that some portion of the product will never get dropped during a given product distribution run.

The longer the product remains on the conveyor, the more it cools and, consequently, the ore moisture that is absorbed by the product. As the product is circulated from the distribution conveyor 100 to the recirculation conveyor 115 and back to the distribution conveyor 100, it will decrease in temperature to the point that the vapor pressure of the product is exceeded by the surrounding atmosphere. When this happens, the product absorbs moisture from the atmosphere, increasing its moisture content. Excess moisture in a packaged product can lead to premature staling. The shelf life of the packaged product is therefore reduced when the product makes a subsequent pass on the distribution conveyor 100. Furthermore, even if only a portion of the product packaged in a bag bad been recirculated, the absorbed moisture of the recirculated product would also affect the product that had not absorbed any moisture, causing it to go stale faster as well.

Environmental conditions of the room can be controlled by increasing the temperature and decreasing the humidity. This is not a feasible solution because the equipment needed to control the environment in the room is extremely expensive to purchase, operate, and maintain. Another alternative is to keep the product warmer by using infrared heaters placed above the product. Using this method to keep the product warm, the product could theoretically be circulated for hours at higher than room temperature without absorbing moisture from the ambient air. However, the obvious shortcoming of this solution is that it would require an electrical or gas energy source. This added energy cost decreases the profitability of the operation and makes it a much less attractive solution. Further, maintaining the product at an elevated temperature for an extended period of time could affect the characteristics and quality of the product.

Thus, the best solution is to develop a method and apparatus for dispensing the product into the weighing mechanism as soon as possible after it enters the packaging line, preferably on the first pass of the product through the distribution conveyor. When packaged in this manner, the product does not have time to cool down and absorb moisture from the ambient air before it is packaged in a vapor-proof bag.

SUMMARY OF THE INVENTION

The present invention decreases the length of time that the product remains on the distribution conveyor by utilizing a plurality of stopper gates to ensure that over 95% of the product is packaged on the first pass through the distribution conveyor. Each of the stopper gates are placed adjacent to a slide door near the end of the distribution conveyor. In operation, the stopper gate is rotated downward into the closed position so that the product may not get past the stopper gate. A sensor is used to determine the product level so that if the product level reaches a predefined height in the distribution conveyor, the stopper gate will automatically open and allow the product to pass on to the recirculation conveyor. Because the stopper gate is placed adjacent to a slide door in the distribution conveyor, it holds a product there for a length of time which usually allows the product to drop into that particular slide door so that it is packaged on the first run, rather than on a second or subsequent recirculation.

Although only one stopper gate is operational at any given time, multiple gates are used to provide for the situation in which the slide door closest to the downstream end of the conveyor is inoperable because the weigher associated with that slide door is not accepting product. In such a case, the next stopper gate upstream would be the operational gate. By providing three or more stopper gates, it is highly unlikely that all three of the slide doors adjacent to the stopper gates would be inoperable. Thus, more assurance is provided that the product will be packaged on the first pass through the distribution conveyor.

A computer control device is used to continually time the slide door actuation to determine which one is the last operational weigher so that the appropriate stopper gate may be closed. A timer is also provided to determine bow long the sliding door is closed. If the sliding door is closed for a pre-determined time, then it is assumed that the weigher is inoperable at that sliding door, and the stopper gate is opened.

The above as well as additional features and advantages of the present invention will become apparent in the following written detailed description.

DETAILED DESCRIPTION

Figure 1B:
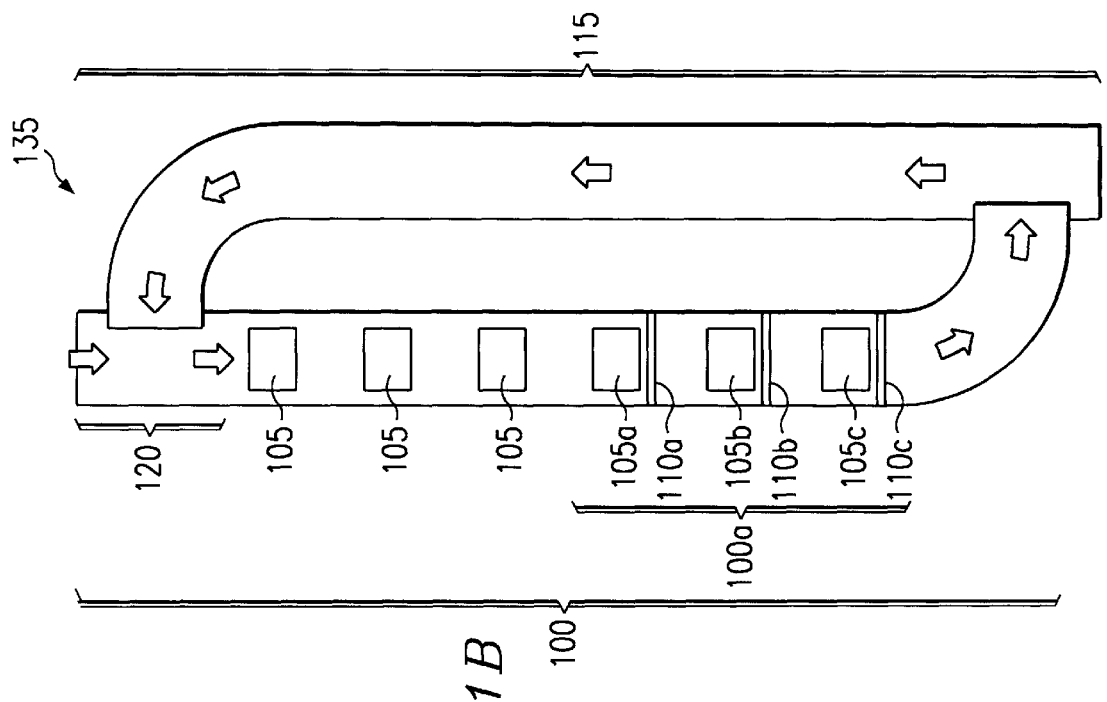
FIG. 1B is an overhead schematic of one embodiment of the conveyor system of the present invention.
Figure 1A:
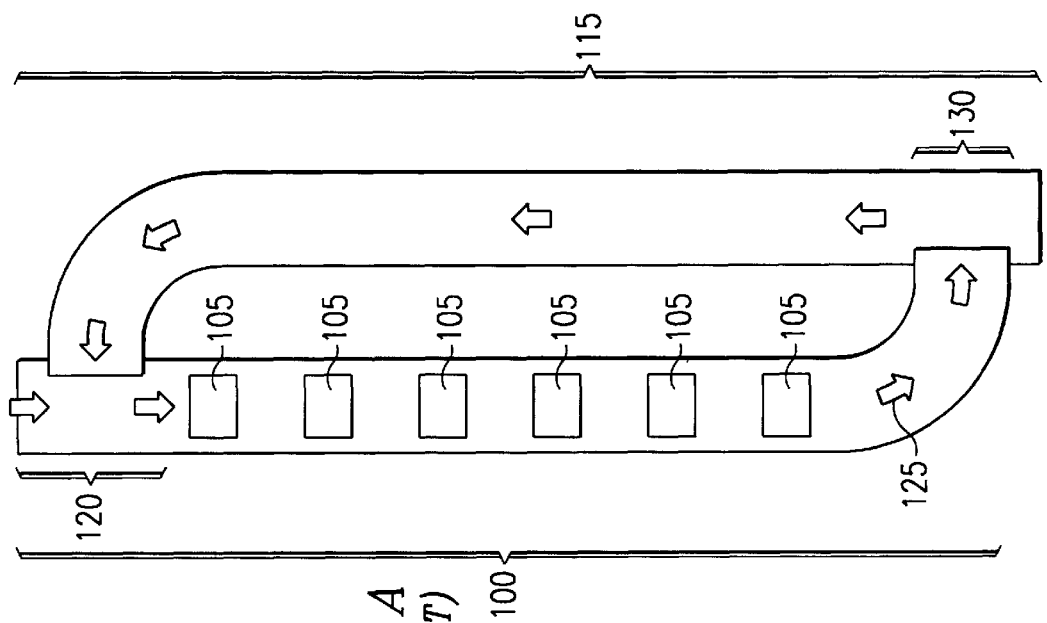
FIG. 1A is an overhead schematic of a prior art conveyor system.

FIG. 1B is an overhead schematic of a preferred embodiment of the conveyor system of the present invention. Three stopper gates 110a, 110b, 110c are placed adjacent to respective slide doors 105a, 105b, 105c at the downstream end 100a of the distribution conveyor 100. The stopper gates 110 are placed at the downstream end 100a to give the product a chance to be dropped into one of the upstream slide doors 105a, 105b, 105c before reaching the stopper gates 110a, 110b, 110c.

Figure 2B:
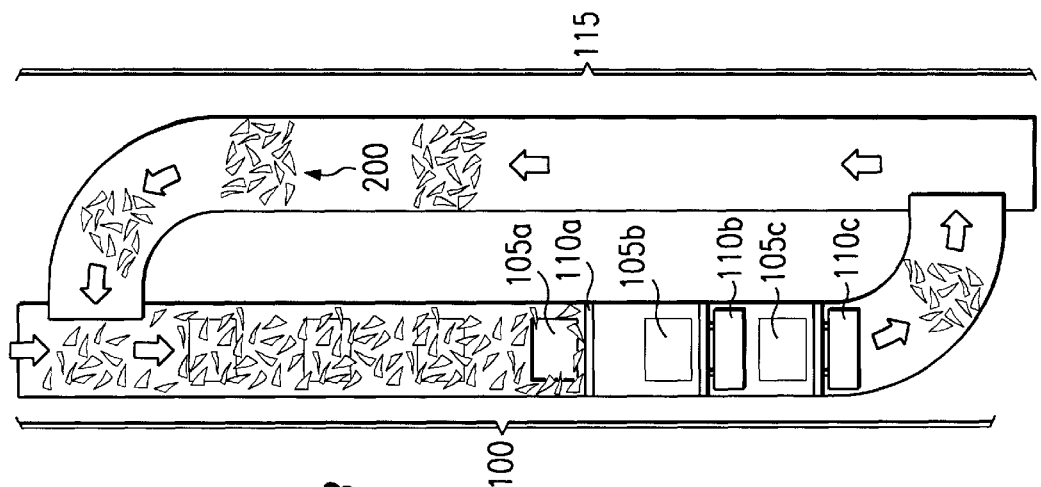
FIG. 2B is an overhead schematic of one embodiment of the conveyor system of the present invention in operation.
Figure 2A:
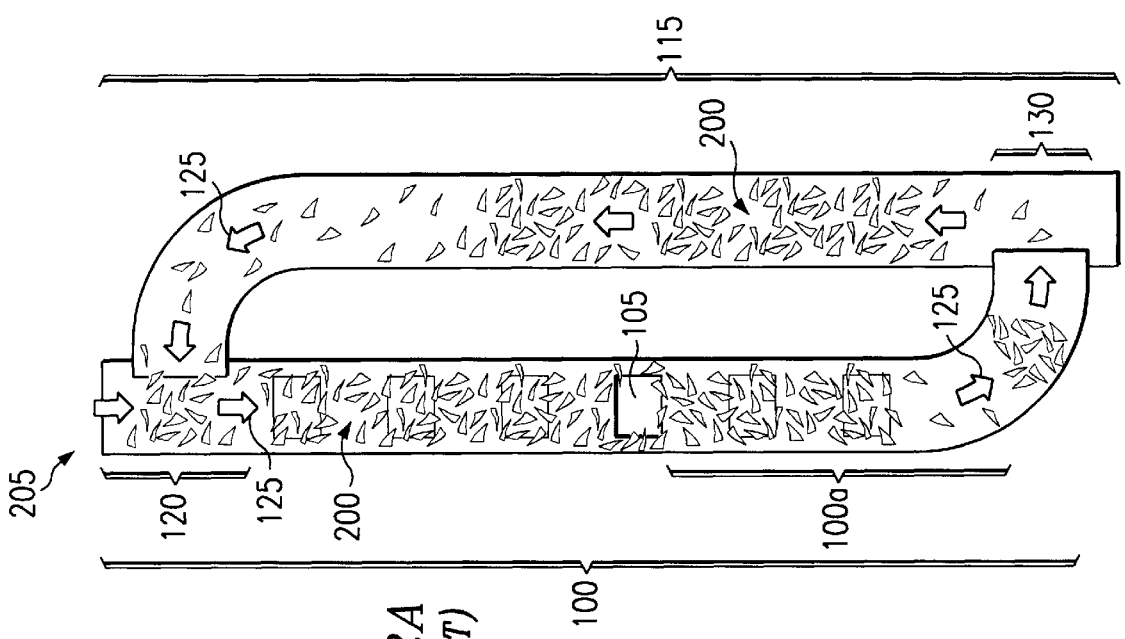
FIG. 2A is an overhead schematic of a prior art conveyor system in operation.

FIG. 2B is an overhead schematic of a preferred embodiment of the conveyor system of the present invention in operation. Three stopper gates 110a, 110b, 110c are placed adjacent to respective slide doors 105a, 105b, 105c. Although three stopper gates 110a, 110b, 110c are shown, the present invention is not limited to three. Only one stopper gate may be installed, or four, five, etc. may be installed on the distribution conveyor, depending on the conveyor operating characteristics, the operator's requirements, and economic considerations.

FIG. 2B shows the mode of operation in which two of the stopper gates 110b, 110c are open because the weigher located below these two stopper gates is not operational for some reason. A weigher may be inoperable at a given location because it is currently not being used or because it has been temporarily shut down due to packaging film changeovers, bag maker problems, or other conditions. A bag maker (not shown) for bagging the product is typically located beneath a weigher under each of the slide doors 105a, 105b, 105c. If one of the bag makers is inoperable, then the weigher will not be accepting product. Thus, at any given time, the operable weigher machine closest to the downstream end of the distribution conveyor 100 will be the one associated with the operating stopper gate. Therefore, the two downstream stopper gates 110b, 110c remain in the open position until the underlying weigher begins accepting product again. If one of the weighers downstream does begin accepting product again, then the upstream stopper gate 110a opens and the stopper gate that is adjacent the weigher that is now accepting product is closed. For example, if the weigher associated with the intermediate stopper gate 110b begins working, then the upstream stopper gate 110a opens and intermediate stopper gate 110b will then close. However, in the case where the weighers associated with both the intermediate and downstream stopper gates 110b, 110c begin working again simultaneously, or where the weigher associated with the downstream stopper gate 110c begins working again first, then the upstream stopper gate 110a will open and downstream stopper gate 110c will close. The intermediate stopper gate 110b remains open in this case. Thus, the system operates such that there is only one stopper gate 110 closed at any given time and the one that is closed is the one associated with the operable weigher that is nearest the downstream end of the distribution conveyor 100. Using the stopper gate of the present invention in such a manner results in approximately 2% of the product 200 passing completely through the distribution conveyor on the first pass, meaning that approximately 98% of the product 200 is deposited into the slide doors 105 on the first pass without being recirculated on the recirculation conveyor 115.

One skilled in the art will recognize that any form of control system may be used to operate the stopper gates of the present invention. Generally, the software that operates the slide doors is modified to accommodate additional devices on the distribution system. However, any type of control system, whether computer-driven or manual, or whether dependent or independent falls within the scope of this invention. Additionally, a different mode of operating the stopper gates from that described above may be used without departing from the spirit of the present invention.

Figure 3A:
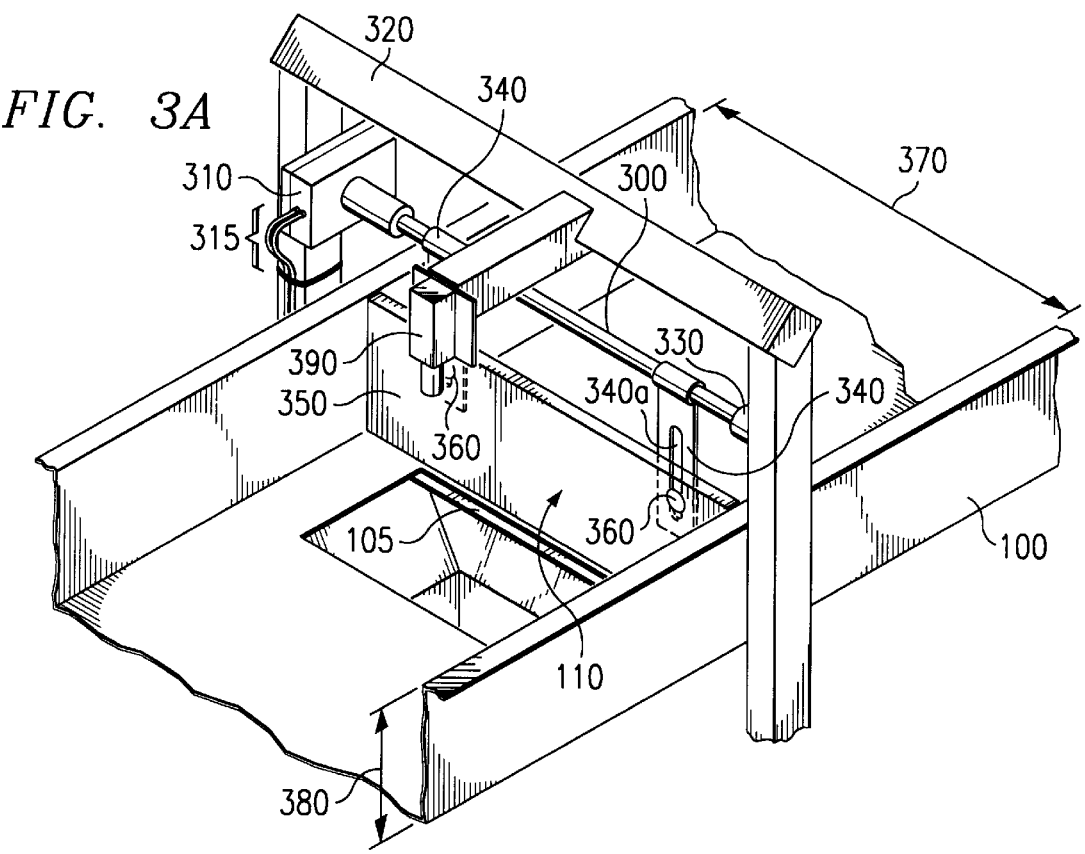
FIG. 3A is a perspective view of a preferred embodiment of the stopper gate of the present invention in the closed position.
Figure 3B:
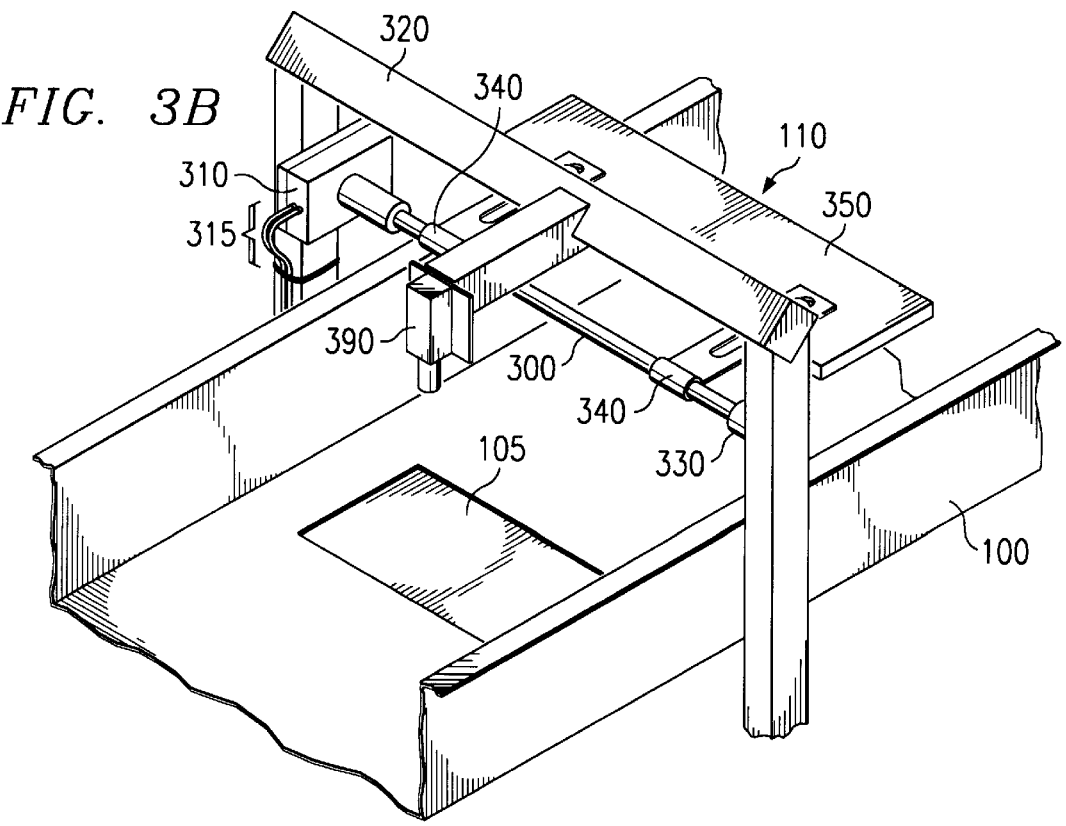
FIG. 3B is a perspective view of a preferred embodiment of the stopper gate of the present invention in the open position.

FIG. 3A is a perspective view of a preferred embodiment of the stopper gate 110 of the present invention in the closed position. FIG. 3B is a perspective view of a preferred embodiment of the stopper gate 110 of the present invention in the open position. A cylindrical rod 300 is attached on one end to a rotary pneumatic actuator 310 which is attached to a frame 320. The pneumatic actuator 310 used in one preferred embodiment is a Festo Series DRQD-32 with a 90 degree cycle of operation. Two pneumatic lines 315 are used to operate the actuator. The lines 315 are connected to a two port Festo pneumatic solenoid that controls the application and direction of pneumatic pressure to the actuator 310. A throttling valve is also used in conjunction with the pneumatic solenoid to operate the stopper gate slowly. The invention is not limited to a pneumatic actuator. Any actuator capable of opening and closing the stopper gate as needed may be used. Pneumatic actuators are preferred in the food industry because they are cleaner and more efficient to operate than a hydraulic or mechanical actuator.

The opposite end of the cylindrical rod 300 is attached to the frame 320 such that it may be rotated in a bearing surface 330. In one preferred embodiment, the bearing surface is a plain bearing manufactured from UHMW board. UHMW is a ultra high molecular weight plastic which is very dense, wears well, is easy to clean, and is commonly used in the food industry. One skilled in the art will recognize that other suitable bearing surfaces may be used, and the invention is not limited to the particular bearings used.

Two stainless steel rectangular plates 340 are attached to the cylindrical rod 300 so that they extend radially outward from the rod 300 on the same plane. Slots 340a are provided in the rectangular plates 340 to attach a rectangular UHMW board 350 using fasteners 360 such that the height of the board 350 is adjustable to provide the proper clearance between the board 350 and the distribution conveyor 100. The board 350 width corresponds to the width 370 of the distribution conveyor 100 with a tolerance built in to allow for slight movements from side to side. The depth of the UHMW board corresponds to the depth of the conveyor pan 380. In operation the rotary actuator 310 does not close the stopper gate 110 unless the door 105 adjacent to the stopper gate 105 is in the open position. This prevents breakage of the product when the stopper gate 110 moves into the closed position. The stopper gate could also be constructed so that it moves vertically within a plane rather than rotating about the cylindrical rod. However, a rotating stopper gate is preferred because it results in less product breakage. The invention is not limited to the shape or material of the stopper gate. Any gate that functions to stop the product from flowing down the distribution conveyor is sufficient to come within the scope of the invention. Once the stopper gate is in the closed position, the slide door 105 opens and closes as required by the needs of the associated weigher.

An ultrasonic sensor 390 is placed above the product approximately one foot in front of the stopper gate and is attached to the frame 320. Ultrasonic sensors are used extensively in the food industry to measure product level because of their accuracy. A suitable sensor is the Hyde Park 556 series. However, the invention is not limited to an ultrasonic sensor. Any sensor capable of detecting a predefined product level at a particular location on the distribution conveyor is sufficient for the purposes of this invention. When the product builds up to a user-defined product level on the distribution pan 100, the stopper gate 110 opens and stays open until the product level drops to an acceptable level. A debounce timer is also used in the control system to desensitize the system so that the stopper gate is not constantly opening and closing. Naturally, the product level will drop rapidly when the stopper gate is opened, but it is not desirable for the stopper gate to close immediately after it is opened. The debounce timer can be simply a delay created by the software of the control system that keeps the stopper gate open for a predefined time before allowing it to close again, regardless of the level of product sensed by the ultrasonic sensor. A timer is also used to monitor the frequency of slide door 105 actuations. If the slide door 105 is not actuated for a predetermined period, for example 20 seconds, then it is assumed that the weigher associated with that slide door 105 is inoperable and the adjacent stopper gate 110 is opened by the actuator 310. This is to prevent the product from going stale by being held too long by the stopper gate.

Figure 4:
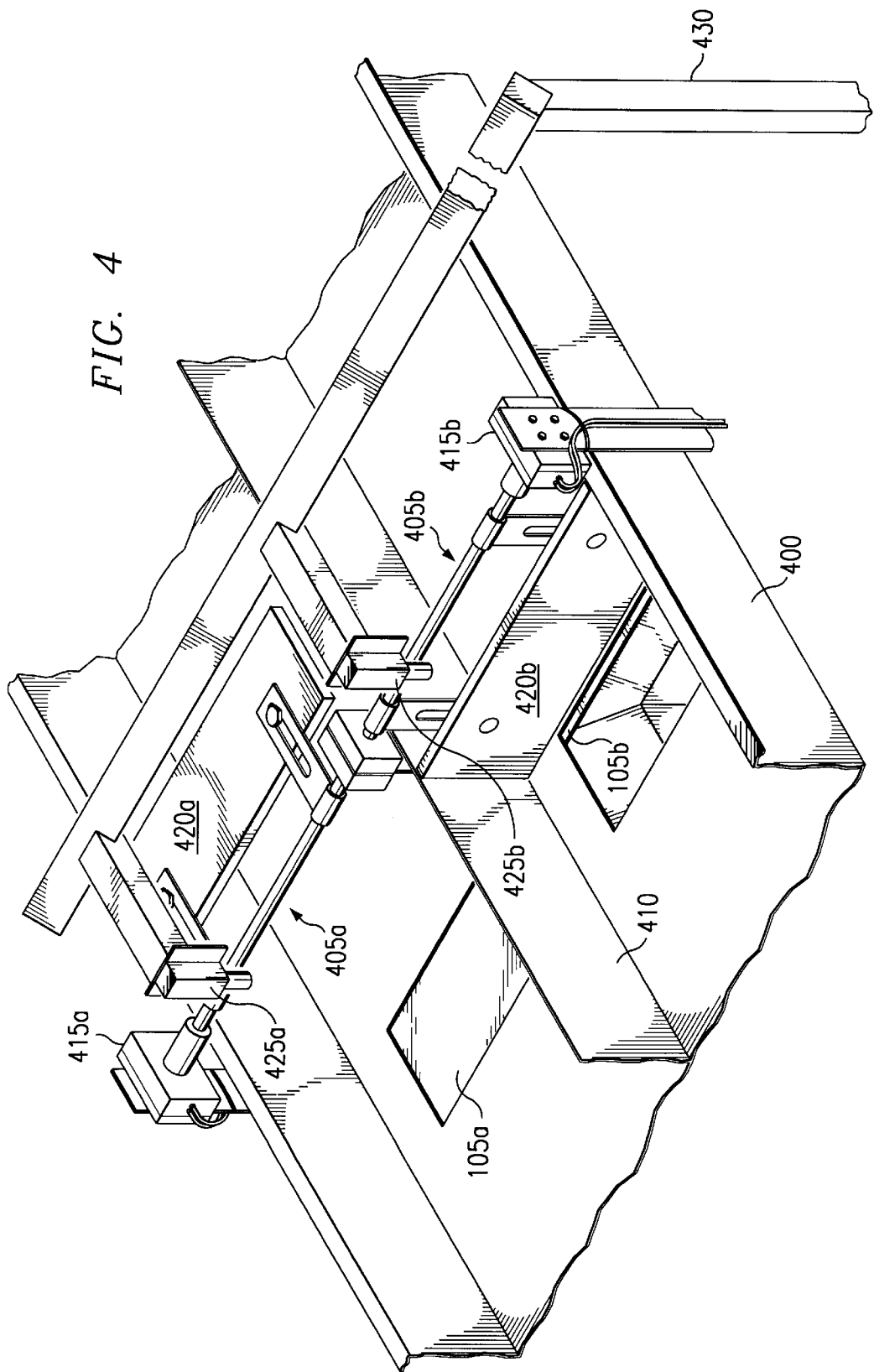
FIG. 4 is a perspective view of a preferred embodiment of two of the stopper gates of the present invention installed on a split pan conveyor system.

FIG. 4 is a perspective view of a preferred embodiment of two of the stopper gates of the present invention installed on a split pan conveyor system. Two separate cylindrical rods 405a, 405b are used to operate each stopper gate 420a, 420b independently. The left cylindrical rod 405a is used for the left stopper gate 420a, and the right cylindrical rod 405b is attached to the right stopper gate 420b in a manner similar to the single pan configuration of FIGS. 3A and 3B. The rods 405a, 405b are supported on the outside ends by rotary actuators 415a, 415b which are used to rotate the cylindrical rods 405a, 405b independently of one another. The inside ends of the cylindrical rods 405a, 405b are supported by a bearing surface. Two sensors 425a, 425b are placed over the middle section of each half of the split pan 400. The sensors are attached to the frame 430. A split pan configuration is simply a distribution conveyor 400 with a divider 410 in the middle such that product flows down each side of the distribution conveyor 400. The distribution conveyor 400 acts as two separate conveyors. Therefore, the right and left stopper gates 420a, 420b which are installed on both sides of the distribution conveyor 400 also operate independently of one another.

Figure 5:
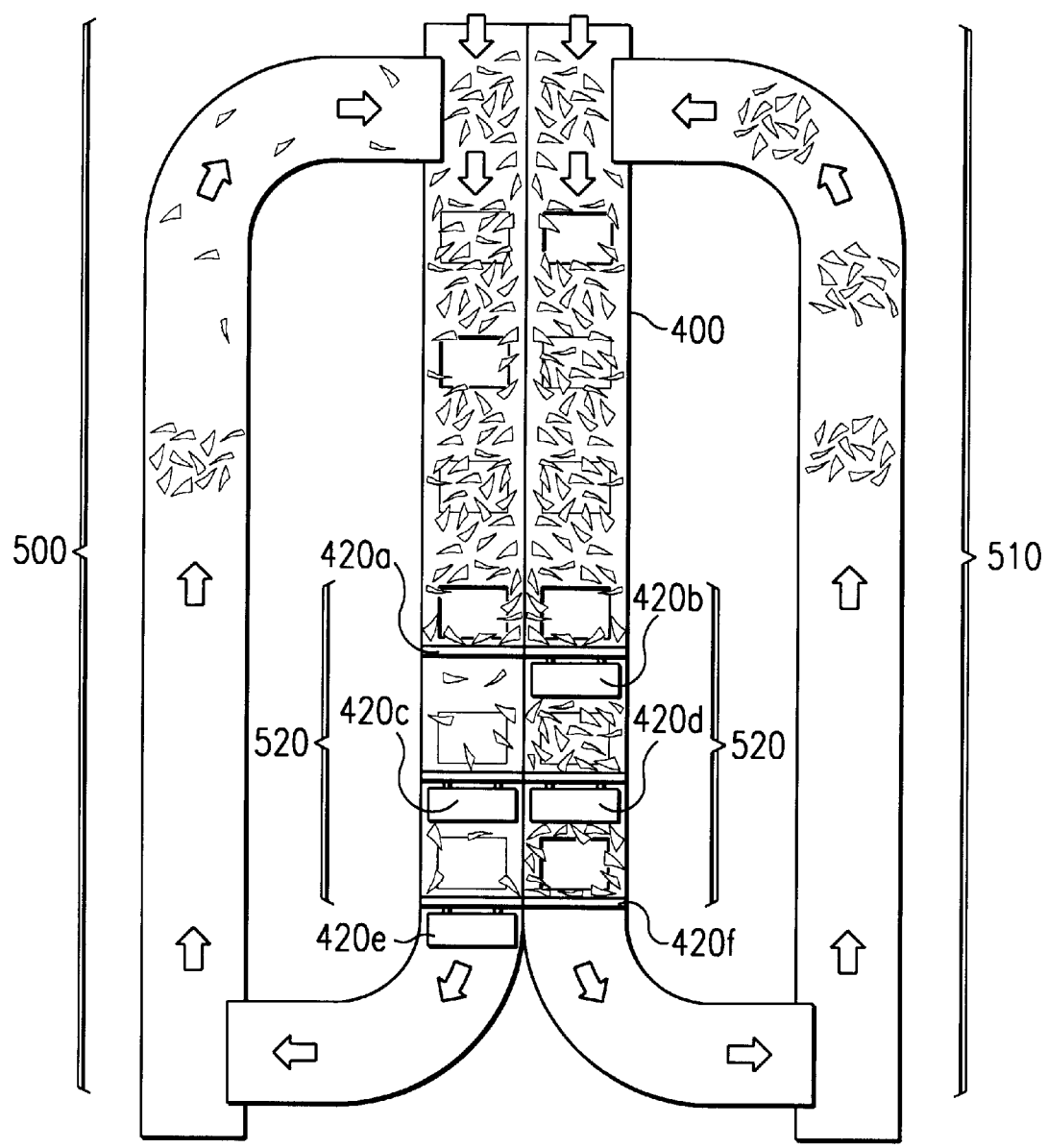
FIG. 5 is an overhead schematic of a preferred embodiment of the split pan conveyor system of the present invention in operation.

FIG. 5 is an overhead schematic of a preferred embodiment of the split pan conveyor system of the present invention in operation. FIG. 5 shows three of the stopper gates 420a, 420c, 420e of FIG. 4 installed in the left half and three stopper gates 420b, 420d, 420f installed in the right half of the split pan. On both sides of the distribution conveyor pan, there are recirculation conveyor pans 500, 510 that are used for the respective half of the split distribution conveyor pan. The stopper gates are placed at the three slide door locations which are closest to the downstream end 520 of the distribution conveyor 400. The split pan configuration operates in a manner similar to the single pan configuration of FIG. 2B.

The above described stopper gate and conveyor system present novel and non-obvious features in the product packaging field. A stopper gate is described which is capable of satisfying the several objects of this invention. However, this invention should not be construed to be limited to the specific construction elicited herein, but rather may be embodied in structures which change one or several of the disclosed features of the illustrated stopper gate. It is to be understood that the invention is intended to cover all changes and modifications to the stopper gate as depicted herein, and all other embodiments not specifically illustrated, which do not constitute a departure from the true spirit and scope of this invention.

What is claimed is:

1. A stopper gate device for use in product conveyor systems, said stopper gate comprising:
    (a) a gate positioned adjacent to a door in a conveyor such that a product flow past said door is stopped when said gate is closed;
    (b) an actuator attached to said gate for opening and closing said gate; and
    (c) a control device attached to the actuator.

2. The stopper gate of claim 1 further comprising a sensor connected to the control device for determining a level of product in the conveyor.

3. The stopper gate device of claim 2 wherein the control device uses the output of the sensor to control the operation of the gate.

4. The stopper gate device of claim 1 wherein the actuator comprises a throttling device for operating the stopper gate at a specified speed.

5. The stopper gate device of claim 1 wherein the actuator comprises a rotary pneumatic actuator.

6. The stopper gate device of claim 1 wherein the control device comprises a debounce timer for desensitizing the system.

7. The stopper gate device of claim 1 wherein the control device uses an operational status of at least one weighing device to control the operation of the gate.

8. The stopper gate device of claim 1 wherein the control device uses an operational status of a weighing device associated with said door to control the operation of the gate.

9. A product conveyor apparatus comprising:
 (a) a distribution conveyor;
 (b) a plurality of doors located in the distribution conveyor;
 (c) at least one stopper gate positioned above the distribution conveyor; and
 (d) a control device for controlling said at least one stopper gate.

10. The product conveyor apparatus of claim 9 wherein said at least one stopper gate is positioned adjacent to a downstream end of one of the plurality of doors.

11. The product conveyor apparatus of claim 10 wherein said at least one stopper gate is timed to close only when an adjacent door is open.

12. The product conveyor apparatus of claim 9 wherein the control device receives a signal from a sensor that indicates a level of a product in the distribution conveyor.

13. The product conveyor apparatus of claim 12 wherein the control device opens said at least one stopper gate when a predetermined level of product is sensed by the sensor.

14. The product conveyor apparatus of claim 9 further comprising a debounce timer connected to the control device.

15. The product conveyor apparatus of claim 9 wherein the said at least one stopper gate comprises a plurality of stopper gates operating in series.

16. The product conveyor apparatus of claim 15 wherein only one of the plurality of stopper gates is closed at any given time.

17. The product conveyor apparatus of claim 16 wherein each of the stopper gates is associated with a respective door nearest a downstream end of the distribution conveyor.

18. A method for distributing product from a conveyor to product weighers, said method comprising the steps:

a) depositing product onto a distribution conveyor;

b) dropping the product off of the distribution conveyor through slide doors attached to the bottom of the conveyor; and c) holding the product over a slide door using a stopper gate.

19. The method of claim 18 further comprising:
 d) sensing a product level.

20. The method of claim 19 further comprising:
 e) opening and closing the stopper gate based on the sensed product level.

21. The method of claim 19 further comprising:
 e) opening and closing the stopper gate based on an operational status of the weighers.

22. A product conveyor apparatus comprising:
 (a) a conveyor;
 (b) a door located in the conveyor for dispensing product;
 (c) a stopper gate attached to the conveyor for controlling a flow of product down the conveyor; and
 (d) a control device for controlling the stopper gate.

23. The product conveyor apparatus of claim 22 wherein the stopper gate is positioned adjacent to a downstream end of the door.

24. The product conveyor apparatus of claim 23 wherein the stopper gate is timed to close only when the door is open.

25. The product conveyor apparatus of claim 22 wherein the conveyor is a distribution conveyor.

26. The product conveyor apparatus of claim 22 wherein the control device receives a signal from a sensor that indicates a level of a product in the distribution conveyor.

27. The product conveyor apparatus of claim 26 wherein the control device opens the stopper gate when a predetermined level of product is sensed by the sensor.

28. The product conveyor apparatus of claim 22 further comprising a debounce timer connected to the control device.

* * * * *